2,933,502

BENZIMIDAZOLONE DERIVATIVES

Hein L. Klopping, Wilmington, Del., assignor to E. I. du Pont de Nemours and Company, Wilmington, Del., a corporation of Delaware No Drawing. Application February 12, 1958
Serial No. 714,702

1 Claim. (Cl. 260—299)

This invention relates to chelates of esters of 2-aminobenzimidazole carboxylic acids, and to fungicidal compositions and methods employing these chelates.

It has been found that compounds represented by the following formula possess outstanding fungicidal activity:

Formula I

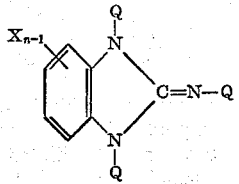

wherein X is selected from the group consisting of hydrogen, halogen, nitro, alkyl groups containing 1 through 6 carbon atoms and alkoxy groups containing 1 through 6 carbon atoms; $n$ is a whole positive integer less than 5, that is 1, 2, 3 or 4; one Q is —COOR, one Q is M, and the remaining Q is hydrogen; R is an aliphatic radical of less than 6 carbon atoms; and M is a cation that forms a salt or chelate with the 2-aminobenzimidazole carboxylic acid esters.

Preferably M is selected from the group consisting of simple metal ions, complexed metal ions capable of additional coordination, and nitrogenous bases having a basicity constant greater than $10^{-5}$. Suitable simple metal ions include ferrous, ferric, manganese, zinc, nickel, chromium, cobalt, cuprous, cupric, calcium, barium, aluminum, magnesium, silver, sodium and potassium. Complexed metal ions capable of additional coordination include species such as partially hydrated metal ions, i.e., $[Ni(H_2O)_4]^{++}$, $[Cu(H_2O)_2]^{++}$, $[Mn(H_2O)_2]^{++}$; basic metal ions, i.e., $[Cu(OH)]^{+}$, $[Cr(OH)]^{++}$, $$[Al(OH)]^{++}, [Zn(OH)]^{+}$$

metal ions containing other coordinated groups, i.e., $[Zn(NH_3)_2]^{++}$, $[Co(ethylenediamine)]^{+++}$, $$[Fe(C_2O_4)]^{+}$$

and combinations of the above, i.e., $[Cu(OH)(H_2O)]^{+}$, $[Fe(C_2O_4)(H_2O)_2]$, $[Co(CO_3)(H_2O)_2]^{+}$, $$[Cr(OH)(H_2O)]^{++}$$

$[Cu(H_2O)(dimethylformamide)]^{++}$. Nitrogenous bases having a basicity constant greater than $10^{-5}$ include ammonia, alkyl substituted ammonium, ethylenediamine, piperazine, benzylamine, etc. It should be understood that the species described above are in the form in which they exist (as the product) in combination with the 2-aminobenzimidazole carboxylic acid esters, and not necessarily the species used in the preparation of the products.

R, an aliphatic hydrocarbon radical of less than 6 carbon atoms, can be an alkyl such as methyl, ethyl, β-chloroethyl, propyl, butyl, isopropyl, amyl and n-hexyl. Alternatively, R can be an alkenyl, such as vinyl, allyl and butenyl or an alkinyl such as propargyl.

It will be understood that the above structure may exist in two tautomeric forms since at least one Q is always hydrogen.

Formula II

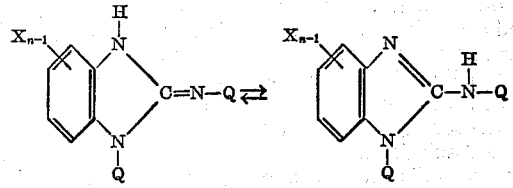

The metal derivatives of Formula I are prepared readily from the corresponding organic molecules by dissolving the appropriate ester and the desired cation separately in suitable solvents, mixing solutions in appropriate molecular proportions, and isolating the metal derivative formed by filtration or evaporation. In certain cases, illustrated by the examples which follow below, it is advantageous to prepare heavy metal chelates via the alkali metal salts of the esters rather than directly from the esters.

The organic molecules used as intermediates in the preparation of the metal derivatives of Formula I can be prepared by a number of routes. For example, the 1-substituted esters are conveniently prepared by reacting a 2-aminobenzimidazole and an alkyl chloroformate, either in the absence or the presence of a base, in accordance with the following scheme:

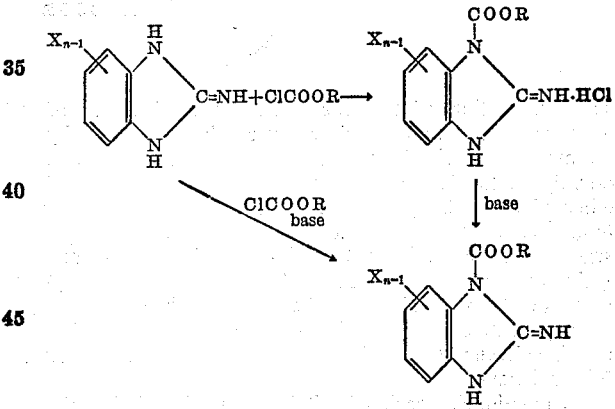

In this scheme X, $n$ and R have the same significance as in Formula I.

The above reactions may be carried out in a great many different solvents such as water, acetone, methanol, ethanol, chloroform, dioxane, DMF and many others. Mixtures of these solvents can also be used, e.g., aqueous acetone or a mixture of chloroform and water. These mixtures are particularly suitable in cases where the base used is soluble only in water.

Suitable bases are sodium hydroxide, sodium acetate, sodium carbonate, postassium carbonate, sodium bicarbonate, trimethylamine, triethylamine, pyridine and many others. These bases may be used either as such or in the form of a solution in a suitable solvent.

The reaction temperature is in general not critical and may be anywhere in between the freezing point and the boiling point of the reaction mixture, provided this boiling point is below the temperature at which reactants and products decompose. As is well known, alkyl chloroformates tend to decompose in certain solvents such as dimethylformamide (DMF) at room temperature and above. Accordingly, when dimethylformamide (DMF) is being used, cooling to a temperature in the neighborhood of 10° C. or less helps avoid undue losses of alkyl chloroformate. Likewise, alkyl chloroformates are relatively unstable in hot water, particularly under basic conditions.

As illustrated by the above scheme, the compounds of this invention may be prepared either in the absence or in the presence of a base. In the former case, the hydrochlorides of the products are obtained, which can be subsequently neutralized; in the latter case the free esters form. It is also possible to add the alkyl chloroformate and the base, either as such or in solution or suspension, simultaneously to a stirred solution or suspension of the appropriate 2-aminobenzimidazole. Because of the ease and rapidity with which these reactions take place, they can be carried out continuously, in a pipe reactor, by the simultaneous addition of alkyl chloroformate and base.

The 2-substituted esters of Formula I are easily prepared according to the following sequence of reactions:

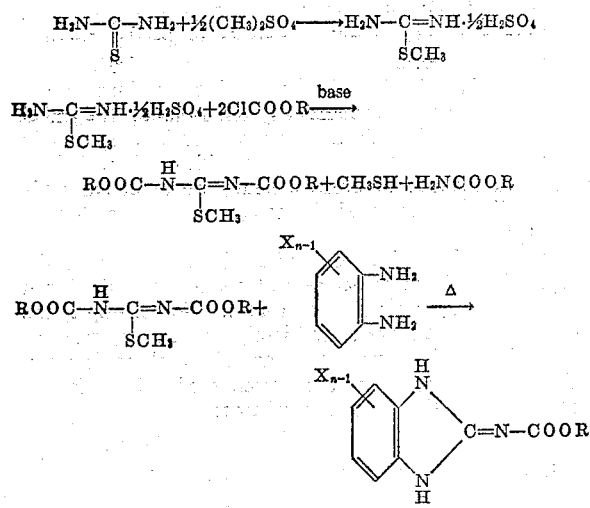

The preparation of the intermediate methyl ethers of thiocarbonylbiscarbamic acid esters can be carried out by the method described by Olin and Dains [J. Am. Chem. Soc. 52, 3326 (1930)] for the preparation of the methyl ether of thiocarbonyldiurethane. The reaction of these methyl ethers with the o-phenylenediamines of the above scheme can be carried out as described by Murray and Dains [J. Am. Chem. Soc. 56, 144 (1934)] for the preparation of 2-benzimidazole-carbamic acid, ethyl ester.

In order that the present invention be more fully understood, reference should be made to the examples which follow below.

As mentioned previously, it has been found that the compounds of this invention possess outstanding fungicidal activity, controlling a wide variety of fungus diseases of plants without damaging the host.

Also, certain of these compounds have exhibited systemic fungicidal activity, a unique type of activity that heretofore has been found in almost no other compounds. Because of this systemic activity, fungicidal control of a plant is prolonged in comparison to that obtained with non-systemic fungicides. As a result, the active fungicidal compounds need be applied much less frequently. This is a result of the absorption of the fungicidal compound by the plant and the resulting translocation of active material to newly grown areas. In this same manner, areas of the plant that did not come into contact with the fungicidal compound because of the lack of complete coverage obtained with mechanical equipment, are protected.

In practicing the fungicidal methods of my invention, one or more of the active ingredients is applied to the organic material to be treated for the control of fungi at a dosage sufficient to exert fungicidal action. Accordingly, my compositions and methods are applicable for the protection of carbohydrates, proteins and fats. They are particularly suited for the treating of plants such as vegetables, ornamentals, and fruit-bearing trees. Some of these compositions are also effective when applied directly to the soil for controlling soil-borne pathogenic plant fungi. Also they can be used to treat organic fibers and fabrics, leather and various cellulosic materials such as wood. Likewise they can be used to treat paints and lubricating oils.

In application to plants, fungicidal control is obtained in most instances by spraying the active compound on the plants in a concentration of from 0.05 to 0.50% active ingredient in the spray. The optimum amount within this range is largely dependent upon the particular fungicidal compound selected, the method of application, and, in the case of application to vegetation, the state and condition of growth of the vegetation to be treated, and the climatic conditions.

The fungicidal compositions of my invention contain in sufficient amount to exert fungicidal action one or more of the above-described active compounds in admixture with a carrier material or conditioning agent of the kind used and commonly referred to in the art as a fungicide adjuvant or modifier. The conventional fungicide adjuvants are inert solids, hydrocarbon liquid diluents and surface-active agents. They provide formulations adapted for ready and efficient application using conventional applicator equipment. Usually from about 1–95% by weight of the fungicidal composition is active ingredient.

Solid compositions are preferably in the form of powders. They are compounded as homogeneous powders that can be either used as such, diluted with inert solids to form dusts, or suspended in a suitable liquid medium for spray application. The powders usually comprise active ingredient admixed with some amounts of conditioning agent. Natural clays, either adsorptive such as attapulgite or relatively non-adsorptive such as kaolin clays can be used. Diatomaceous earth, walnut shell flour, tobacco dust, redwood flour, synthetic fine silica, and other inert solid carriers of the kind conventionally employed in powder fungicidal compositions can also be used. The active ingredient usually makes up from about 25–90% of these powder compositions. For conversion of the powders to dusts, talc, pyrophyllite, tobacco dust, volcanic ash and other dense, rapid-settling inert solids customarily are used.

Liquid compositions employing one or more of the fungicidally-active ingredients are prepared by admixing the active ingredient with a suitable liquid diluent medium. The active ingredient can be either in solution or in suspension in the liquid medium. Typical of the liquid media commonly employed as fungicide adjuvants are water, kerosene, Stoddard solvent, xylene, alcohols, alkylated naphthalene and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials cause the compositions to disperse or emulsify easily in water to give aqueous sprays.

The surface-active agents employed can be of the anionic, cationic or non-ionic type. They include, for example, sodium oleate, sulfonated petroleum oils, alkyl aryl sulfonates, sodium lauryl sulfate, polyethylene, oxide modified fatty esters, sulfonates, and other surface-active agents. A detailed list of such agents is set forth in an article by McCutcheon in "Soap and Chemical Specialties," volume 31, Nos. 7–10 (1955).

In some cases it may be desirable to employ the active compounds of the present invention in combination with other fungicides to give compositions that have broad spectrum fungicidal activity. In these mixtures, the fungicidally active materials can be present in any desired amount, ordinarily from about 0.1–20 parts by weight of a compound represented by Formula I per part by weight of the auxiliary fungicidally active material. In some instances it may even be desirable to employ two or more auxiliary fungicides.

Typical of the auxiliary fungicides that can be employed in combination with the compounds of the present invention are the following:

N-trichloro-methylthio-4-cyclohexene-1,2-dicarboxamide
Tetramethylthiuram disulfide
Manganese ethylene-bis-dithiocarbamate
Ferric dimethyl dithiocarbamate
Zinc ethylene-bis-dithiocarbamate
Zinc dimethyl dithiocarbamate (ziram)
Tetra copper calcium oxychloride
Tetrachloro-p-benzoquinone (chloranil)
2,3-dichloro-1,4-naphthoquinone (dichlone)
2,4-dichloro-6-(o-chloroanilino) triazine (dyrene)
Ethylene thiuram monosulfide
2-heptadecyl glyoxalidine acetate (glyodin)
Ferric dimethyl dithiocarbamate plus 2-mercaptobenzothiazole
Manganese dimethyl dithiocarbamate plus 2-mercaptobenzothiazole
Copper dihydrazinium sulfate
Copper-8-quinolinolate
Cycloheximide

Example 1

To a solution of 120 grams (0.9 mole) of 2-aminobenzimidazole in 1700 ml. of acetone are added 90 grams (6% excess over 0.9 mole) of methyl chloroformate while stirring over a period of 2¾ hours. The temperature is kept at 35° C. by external heating. After stirring for one additional hour, the mixture is filtered with suction. The solid is washed with acetone and dried. The white crystalline solid weighs 197 grams (97%), M.P. 140–142° dec. It consists of 2-amino-1-benzimidazole- carboxylic acid, methyl ester, hydrochloride.

The thusly prepared material is dissolved in 750 ml. of water. While stirring, a 10% aqueous sodium hydroxide solution is added in a thin stream until a pH of 8.5 is reached. The mixture is filtered with suction. The solid is washed with water and dried. After recrystallization from chloroform, the compound melts at 163–164° dec. It is 2-amino-1-benzimidazole carboxylic acid, methyl ester.

*Analysis.*—Calcd. for $C_9H_9N_3O_2$: C, 56.5; H, 4.75; N, 22.0. Found: C, 56.78; H, 4.98; N, 22.03.

To a solution of one molar equivalent of 2-amino-1-benzimidazole carboxylic acid, methyl ester in the minimum volume of warm dimethylformamide is added a solution of one-half molar equivalent of cupric acetate monohydrate in the minimum volume of warm dimethylformamide, while stirring. On continued stirring, a light yellowish-green precipitate forms in the bright green solution, which is 2-amino-1-benzimidazole carboxylic acid, methyl ester 2:1 copper II complex. The solid is collected on a filter, washed with dimethylformamide, then with methanol and dried. The compound analyzes for the composition $(C_9H_8N_3O_2)_2Cu$. Structure of this compound:

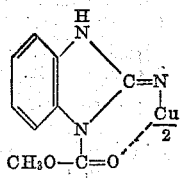

0.2% by weight water suspension of this chemical is prepared and applied to tomato plant foliage. When the spray deposit has dried, the foliage is inoculated with spores of the early blight fungus (*Alternaria solani*). After a suitable incubation period the foliage is examined and it is found that there is 0% disease on the treated foliage and 100% disease on the untreated foliage.

Example 2

The methyl ether of thiocarbonylbiscarbamic acid dimethyl ester is prepared by the method of Olin and Dains [J. Am. Chem. Soc. 52, 3326 (1930)]. It melts at 99–100°. This compound is reacted with an equimolar quantity of o-phenylenediamine in refluxing ethanol following the method of Murray and Dains [J. Am. Chem. Soc. 56, 144 (1934)]. The product is isolated by filtration, washing with ethanol and water, and drying. The product undergoes slight decomposition resembling sublimation at 215–217° and remains virtually unchanged on further heating up to 300°. The yield is 95% of 2-benzimidazolecarbamic acid, methyl ester.

*Analysis.*—Calcd. for $C_9H_9N_3O_2$: C, 56.5; H, 4.75; N, 22.0. Found: C, 56.53; H, 4.88; N, 22.43.

Equimolar quantities of 2-benzimidazole carbamic acid, methyl ester, and cupric acetate monohydrate are dissolved separately in dimethylformamide. Two molar equivalents of sodium methylate are dissolved in methanol. The carbamic acid ester and the sodium methylate solutions are combined and then the cupric acetate solution is added with stirring. The mixture is then diluted with water. The resulting precipitate, which is 2-benzimidazole carbamic acid, methyl ester 1:1 hydroxycopper II complex monohydrate, is washed with methanol and then with water and air dried. The product analyzes for the composition $(C_9H_8N_3O_2)\cdot CuOH\cdot H_2O$. Structure of this compound:

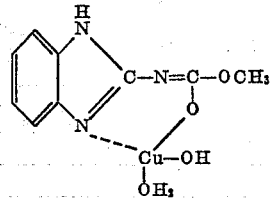

A 0.008% by weight water suspension of this chemical is prepared and applied as a spray to the foliage of young apple trees. When the spray deposit has dried the foliage is inoculated with spores of the apple scab fungus (*Venturia inaequalis*). After a suitable incubation period the foliage is examined and it is found that the chemical allowed 3% disease whereas unprotected foliage was 100% infected.

A water suspension containing 0.001% by weight of the chemical is applied to the surface of the sand in which cucumber plants are growing. The plants are then exposed to the powdery mildew fungus (*Erysiphe cichoracearum*). After a suitable period of incubation the plants are examined for disease development. It is found that no powdery mildew has appeared on the treated plants but the untreated plants are 100% diseased. Thus this compound is also effective as a systemic fungicide.

This same test was repeated with barley plants. It is found that complete control of barley powdery mildew fungus (*Erisiphe graminis*) is obtained. Treated plants have no disease while untreated plants have 100% disease.

Example 3

Equimolar quantities of 2 - amino - 1 - benzimidazole carboxylic acid, methyl ester, cupric acetate monohydrate and two molar equivalents of sodium methylate are dissolved separately in methanol. The sodium methylate solution is added rapidly to the solution of 2-amino-1-benzimidazole carboxylic acid, methyl ester, mixed thoroughly, and the cupric acetate solution is added to the mixture at a moderate rate. A deep green precipitate forms immediately, which is 2-amino-1-benzimidazole carboxylic acid, methyl ester, 1:1 hydroxy copper II complex monohydrate. The solid is collected on a filter, washed first with methanol, then water, and dried. The compound analyzed for the composition $(C_9H_8N_3O_2) \cdot CuOH \cdot H_2O$ Structure of this compound:

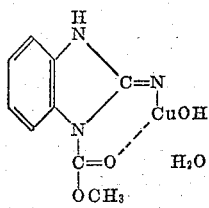

This compound is applied to apple foliage as an aqueous suspension at a concentration of 0.008%. When the spray deposit has dried, the plants are exposed to infection by the spores of apple powdery mildew (*Podosphaera leucotricha*). After a suitable incubation period it is found that the treated plants have essentially no infection whereas untreated control plants have 100% infection.

Example 4

To one molar equivalent of 2-benzimidazole carbamic acid methyl ester dissolved in the smallest amount of hot dimethylformamide is added one-half molar equivalent of cupric acetate monohydrate also dissolved in the minimum amount of dimethylformamide. The resulting mixture has a deep brown color but does not yield the precipitated complex. The addition of a large volume of water to the solution yields a brown precipitate which is filtered, washed with water and air dried. It is 2-benzimidazole carbamic acid, methyl ester, 2:1 copper II complex. The product analyzes for the composition $(C_9H_8N_3O_2)_2Cu$. Structure of this compound:

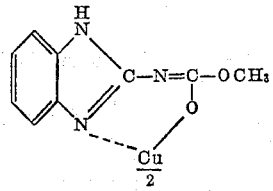

This compound is applied to apple foliage as an aqueous suspension at a concentration of 0.008%. When the spray deposit has dried, the plants are exposed to infection by the spores of the apple scab fungus (*Venturia inaequalis*). After a suitable incubation period it is found that the treated plants have only 10% infection whereas untreated control plants have 100% infection.

The following compounds of the present invention are prepared exactly in accordance with various of the preceding examples, as indicated in the following table, by replacing the reactants of the preceding example with the indicated reactants. The table shows not only the reactants in their relative proportions but also the product obtained.

| Ex. No. | Starting Materials (moles) | | Method of Example No. | Product |
|---|---|---|---|---|
| 5 | 2-benzimidazole carbamic acid, methyl ester (0.1) (prepared by method of Example 2). | $MnCl_2$ (0.05) | 4 | 2-benzimidazole carbamic acid, methyl ester, manganese complex. |
| 6 | ----do---- | $Zn(Ac)_2$ (0.05) | 4 | 2-benzimidazole carbamic acid, methyl ester, zinc complex. |
| 7 | ----do---- | $CaCl_2$ (0.05) | 4 | 2-benzimidazole carbamic acid, methyl ester, calcium complex. |
| 8 | ----do---- | $FeCl_2$ (0.05) | 4 | 2-benzimidazole carbamic acid, methyl ester, ferrous complex. |
| 9 | ----do---- | $CoCl_2$ (0.05) | 4 | 2-benzimidazole carbamic acid, methyl ester, cobalt complex. |
| 10 | 2-amino-1-benzimidazole carboxylic acid, methyl ester (0.1) (prepared by method of Example 1). | $MnCl_2$ (0.05) | 1 | 2-amino-1-benzimidazole carboxylic acid, methyl ester, manganese complex. |
| 11 | ----do---- | $Zn(Ac)_2$ (0.05) | 1 | 2-amino-1-benzimidazole carboxylic acid, methyl ester, zinc complex. |
| 12 | ----do---- | $CaCl_2$ (0.05) | 1 | 2-amino-1-benzimidazole carboxylic acid, methyl ester, calcium complex. |
| 13 | ----do---- | $FeCl_2$ (0.05) | 1 | 2-amino-1-benzimidazole carboxylic acid, methyl ester, ferrous complex. |
| 14 | ----do---- | $CoCl_2$ (0.05) | 1 | 2-amino-1-benzimidazole carboxylic acid, methyl ester, cobalt complex. |
| 15 | 5-chloro-2-benzimidazole carbamic acid, methyl ester (0.1) (prepared by method of Example 2). | $Cu(Ac)_2 \cdot H_2O$ (0.1) $NaOCH_3$ (0.2) | 2 | 5-chloro-2-benzimidazole carbamic acid, methyl ester, 1:1 hydroxy copper complex monohydrate. |
| 16 | ----do---- | $MnCl_2$ (0.05) | 4 | 5-chloro-2-benzimidazole carbamic acid, methyl ester, manganese complex. |
| 17 | 5-chloro-2-amino-1-benzimidazole carboxylic acid, methyl ester (0.1) (prepared by method of Example 1). | $Cu(Ac)_2 \cdot H_2O$ (0.1) $NaOCH_3$ (0.2) | 3 | 5-chloro-2-amino-1-benzimidazole carboxylic acid, methyl ester 1:1 hydroxy copper complex monohydrate. |
| 18 | ----do---- | $Zn(Ac)_2$ (0.05) | 1 | 5-chloro-2-amino-1-benzimidazole carboxylic acid, methyl ester, zinc complex. |
| 19 | 5-nitro-2-amino-1-benzimidazole carboxylic acid, methyl ester (0.1) (prepared by method of Example 1). | $Cu(Ac)_2 \cdot H_2O$ (0.1) $NaOCH_3$ (0.2) | 3 | 5-nitro-2-amino-1-benzimidazole carboxylic acid, methyl ester, 1:1 hydroxy copper complex monohydrate. |
| 20 | ----do---- | $CaCl_2$ (0.05) | 1 | 5-nitro-2-amino-1-benzimidazole carboxylic acid, methyl ester, calcium complex. |
| 21 | 5-nitro-2-benzimidazole carbamic acid, methyl ester (0.1) (prepared by method of Example 2). | $Cu(Ac)_2 \cdot H_2O$ (0.1) $NaOCH_3$ (0.2) | 2 | 5-nitro-2-benzimidazole carbamic acid, methyl ester, 1:1 hydroxy copper complex monohydrate. |
| 22 | ----do---- | $FeCl_2$ (0.05) | 4 | 5-nitro-2-benzimidazole carbamic acid, methyl ester, ferrous complex. |
| 23 | 5-methoxy-2-amino-1-benzimidazole carboxylic acid, methyl ester (0.1) (prepared by method of Example 1). | $Cu(Ac)_2 \cdot H_2O$ (0.1) $NaOCH_3$ (0.2) | 3 | 5-methoxy-2-amino-1-benzimidazole carboxylic acid, methyl ester, 1:1 hydroxy copper complex monohydrate. |
| 24 | 5-methoxy-2-benzimidazole carbamic acid, methyl ester (0.1) (prepared by method of Example 2). | $Cu(Ac)_2 \cdot H_2O$ (0.1) $NaOCH_3$ (0.2) | 2 | 5-methoxy-2-benzimidazole carbamic acid, methyl ester, 1:1 hydroxy copper complex monohydrate. |
| 25 | ----do---- | $MnCl_2$ (0.05) | 4 | 5-methoxy-2-benzimidazole carbamic acid, methyl ester, manganese complex. |
| 26 | 4-methyl-2-amino-1-benzimidazole carboxylic acid, methyl ester (0.1) (prepared by method of Example 1). | $Cu(Ac)_2 \cdot H_2O$ (0.1) $NaOCH_3$ (0.2) | 3 | 4-methyl-2-amino-1-benzimidazole carboxylic acid, methyl ester, 1:1 hydroxy copper complex monohydrate. |
| 27 | ----do---- | $Zn(Ac)_2$ (0.05) | 1 | 4-methyl-2-amino-1-benzimidazole carboxylic acid, methyl ester, zinc complex. |

| Ex. No. | Starting Materials (moles) | | Method of Example No. | Product |
|---|---|---|---|---|
| 28 | 4-methyl-2-benzimidazole carbamic acid, methyl ester (0.1) (prepared by method of Example 2). | Cu(Ac)$_2$·H$_2$O (0.1), NaOCH$_3$ (0.2) | 2 | 4-methyl-2-benzimidazole carbamic acid, methyl ester, 1:1 hydroxy copper complex monohydrate. |
| 29 | do | CaCl$_2$ (0.05) | 4 | 4-methyl-2-benzimidazole carbamic acid, methyl ester, calcium complex. |
| 30 | 5,6-dichloro-2-amino-1-benzimidazole carboxylic acid, methyl ester (0.1) (prepared by method of Example 1). | Cu(Ac)$_2$·H$_2$O (0.1), NaOCH$_3$ (0.2) | 3 | 5,6-dichloro-2-amino-1-benzimidazole carboxylic acid, methyl ester, 1:1 hydroxy copper complex monohydrate. |
| 31 | 5,6-dichloro-2-benzimidazole carbamic acid, methyl ester (0.1) (prepared by method of Example 2). | Cu(Ac)$_2$·H$_2$O (0.1), NaOCH$_3$ (0.2) | 2 | 5,6-dichloro-2-benzimidazole carbamic acid, methyl ester, 1:1 hydroxy copper complex monohydrate. |
| 32 | do | FeCl$_2$ (0.05) | 4 | 5,6-dichloro-2-benzimidazole carbamic acid, methyl ester, ferrous complex. |
| 33 | 4,5,6-tribromo-2-amino-1-benzimidazole carboxylic acid, methyl ester (0.1) (prepared by method of Example 1). | Cu(Ac)$_2$·H$_2$O (0.1), NaOCH$_3$ (0.2) | 3 | 4,5,6-tribromo-2-amino-1-benzimidazole carboxylic acid, methyl ester, 1:1 hydroxy copper complex monohydrate. |
| 34 | do | CoCl$_2$ (0.05) | 1 | 4,5,6-tribromo-2-amino-1-benzimidazole carboxylic acid, methyl ester, cobalt complex. |
| 35 | 4,5,6-tribromo-2-benzimidazole carbamic acid, methyl ester (0.1) (prepared by method of Example 2). | Cu(Ac)$_2$·H$_2$O (0.1), NaOCH$_3$ (0.2) | 2 | 4,5,6-tribromo-2-benzimidazole carbamic acid, methyl ester, 1:1 hydroxy copper complex monohydrate. |
| 36 | 2-amino-1-benzimidazole carboxylic acid, β-chloroethyl ester (0.1) (prepared by method of Example 1). | Cu(Ac)$_2$·H$_2$O (0.1), NaOCH$_3$ (0.2) | 3 | 2-amino-1-benzimidazole carboxylic acid, β-chloroethyl ester, 1:1 hydroxy copper complex monohydrate. |
| 37 | do | Zn(Ac)$_2$ (0.05) | 1 | 2-amino-1-benzimidazole carboxylic acid, β-chloroethyl ester, zinc complex. |
| 38 | 2-benzimidazole carbamic acid, β-chloroethyl ester (0.1) (prepared by method of Example 2). | Cu(Ac)$_2$·H$_2$O (0.1), NaOCH$_3$ (0.2) | 2 | 2-benzimidazole carbamic acid, β-chloroethyl ester, 1:1 hydroxy copper complex monohydrate. |
| 39 | 2-amino-1-benzimidazole carboxylic acid, allyl ester (0.1) (prepared by method of Example 1). | Cu(Ac)$_2$·H$_2$O (0.1), NaOCH$_3$ (0.2) | 3 | 2-amino-1-benzimidazole carboxylic acid, allyl ester, 1:1 hydroxy copper complex monohydrate. |
| 40 | 2-benzimidazole carbamic acid, allyl ester (0.1) (prepared by method of Example 2). | CaCl$_2$ (0.05) | 4 | 2-benzimidazole carbamic acid, allyl ester, calcium complex. |
| 41 | do | Cu(Ac)$_2$·H$_2$O (0.1), NaOCH$_3$ (0.2) | 2 | 2-benzimidazole carbamic acid, allyl ester, 1:1 hydroxy copper complex monohydrate. |
| 42 | 2-amino-1-benzimidazole carboxylic acid, tertiary amyl ester (0.1) (prepared by method of Example 1). | Cu(Ac)$_2$·H$_2$O (0.1), NaOCH$_3$ (0.2) | 3 | 2-amino-1-benzimidazole carboxylic acid, tertiary amyl ester, 1:1 hydroxy copper complex monohydrate. |
| 43 | do | FeCl$_2$ (0.05) | 1 | 2-amino-1-benzimidazole carboxylic acid, tertiary amyl ester, ferrous complex. |
| 44 | 2-benzimidazole carbamic acid, tertiary amyl ester (0.1) (prepared by method of Example 2). | Cu(Ac)$_2$·H$_2$O (0.1), NaOCH$_3$ (0.2) | 2 | 2-benzimidazole carbamic acid, tertiary amyl ester, 1:1 hydroxy copper complex monohydrate. |
| 45 | 4,5,6-tribromo-2-amino-1-benzimidazole carboxylic acid, methallyl ester (0.1) (prepared by method of Example 1). | Cu(Ac)$_2$·H$_2$O (0.1), NaOCH$_3$ (0.2) | 3 | 4,5,6-tribromo-2-amino-1-benzimidazole carboxylic acid, methallyl ester, 1:1 hydroxy copper complex monohydrate. |
| 46 | 4,5,6-tribromo-2-benzimidazole carbamic acid, methallyl ester (0.1) (prepared by method of Example 1). | CaCl$_2$ (0.05) | 4 | 4,5,6-tribromo-2-benzimidazole carbamic acid, methallyl ester, cobalt complex. |
| 47 | 4,5,6-tribromo-2-benzimidazole carbamic acid, methallyl ester (0.1) (prepared by method of Example 2). | Cu(Ac)$_2$·H$_2$O (0.1), NaOCH$_3$ (0.2) | 2 | 4,5,6-tribromo-2-benzimidazole carbamic acid, methallyl ester, 1:1 hydroxy copper complex monohydrate. |

The following examples demonstrate the formulation of fungicidal compositions of the present invention and their use in the control of fungi:

Example 48

| | Percent |
|---|---|
| 5-chloro-2-benzimidazole carbamic acid, methyl ester, 1:1 hydroxy copper complex monohydrate | 25 |
| Kaolin clay | 25 |
| Pyrophyllite | 50 |

The active ingredient is first blended with the minor diluent and micropulverized, then mixed with the major diluent and reblended until substantially homogeneous.

This fungicidal composition, when applied to apple foliage at the rate of 10 pounds active ingredient per acre, prevents powdery mildew (*Podosphaera leucotricha*).

Example 49

| | Percent |
|---|---|
| 5-nitro-2-amino-1-benzimidazole carboxylic acid, methyl ester, zinc complex | 20 |
| Tobacco dust | 80 |

This compound is formulated into a fungicidal dust by blending the listed ingredients together and passing them through a micropulverizer.

This fungicidal composition, when dusted on the foliage of pear trees at the rate of 10 lbs./acre of active ingredient, prevents pear powdery mildew (*Podosphaera leucotricha*).

Example 50

| | Percent |
|---|---|
| 4-methyl-2-benzimidazole carbamic acid, methyl ester, 1:1 hydroxy copper complex monohydrate | 20 |
| Pyrophyllite | 80 |

The above dust composition, when dusted on apple trees at the rate of 10 pounds of active ingredient per acre prevents apple scab (*Venturia inaequalis*).

Example 51

| | Percent |
|---|---|
| 5-nitro-2-benzimidazole carbamic acid, methyl ester, cobalt complex | 50.00 |
| Alkyl naphthalene sulfonic acid, Na salt | 0.75 |
| Low viscosity methyl cellulose | 0.25 |
| Kaolin clay | 49.00 |

This wettable powder, when dispersed in water at a concentration of 2 pounds per 100 gal. of water and sprayed on cucumber foliage at the rate of 100 gal./acre, prevents powdery mildew (*Erysiphe cichoracearum*).

Example 52

| | Percent |
|---|---|
| 5-methoxy-2-amino-1-benzimidazole carboxylic acid, methyl ester, 1:1 hydroxy copper complex monohydrate | 50.00 |
| Alkyl naphthalene sulfonic acid, Na salt | 0.75 |
| Sodium lignin sulfonate | 1.00 |
| Diatomaceous silica | 48.25 |

This wettable powder, when dispersed in water at a concentration of 2 pounds per 100 gal. of water and sprayed on pear trees at the rate of 200 gal. per acre, prevents pear scab (*Venturia pyrina*).

*Example 53*

| | Percent |
|---|---|
| 5-methoxy-2-benzimidazole carbamic acid, methyl ester, 1:1 hydroxy copper complex monohydrate | 75.00 |
| Alkyl naphthalene sulfonic acid, Na salt | 1.00 |
| Sodium lignin sulfonate | 1.00 |
| Diatomaceous silica | 23.00 |

This wettable powder is dispersed in water at a concentration of 0.2% active ingredient. This composition when sprayed on rose foliage prevents powdery mildew (*Sphaerotheca humuli*).

*Example 54*

| | Percent |
|---|---|
| 4-methyl-2-amino-1-benzimidazole carboxylic acid, methyl ester, calcium complex | 75.00 |
| Alkyl naphthalene sulfonic acid, Na salt | 1.00 |
| Methyl cellulose | 0.25 |
| Diatomaceous silica | 23.75 |

This wettable powder, 0.2% concentration active in water, when sprayed on grapes prevents powdery mildew (*Uncinula necator*).

I claim:

A compound represented by the formula

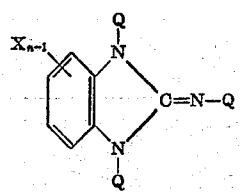

wherein X is selected from the group consisting of hydrogen, halogen, nitro, alkyl groups containing 1 through 6 carbon atoms and alkoxy groups containing 1 through 6 carbon atoms; $n$ is a whole positive integer less than 5; one Q is hydrogen; one Q is —COOR where R is an aliphatic group of less than 6 carbon atoms; and the other Q is a cation that forms a compound selected from the group consisting of a salt and a chelate with the ester molecule.

References Cited in the file of this patent

Pellizzari: Chem. Abstracts, vol. 14, p. 169 (1920).
Murray et al.: J. Am. Chem. Soc., vol. 56, pp. 144–146 (1934).
Ridi et al.: Chem. Abstracts, vol. 49, col. 4658 (1955).